UNITED STATES PATENT OFFICE.

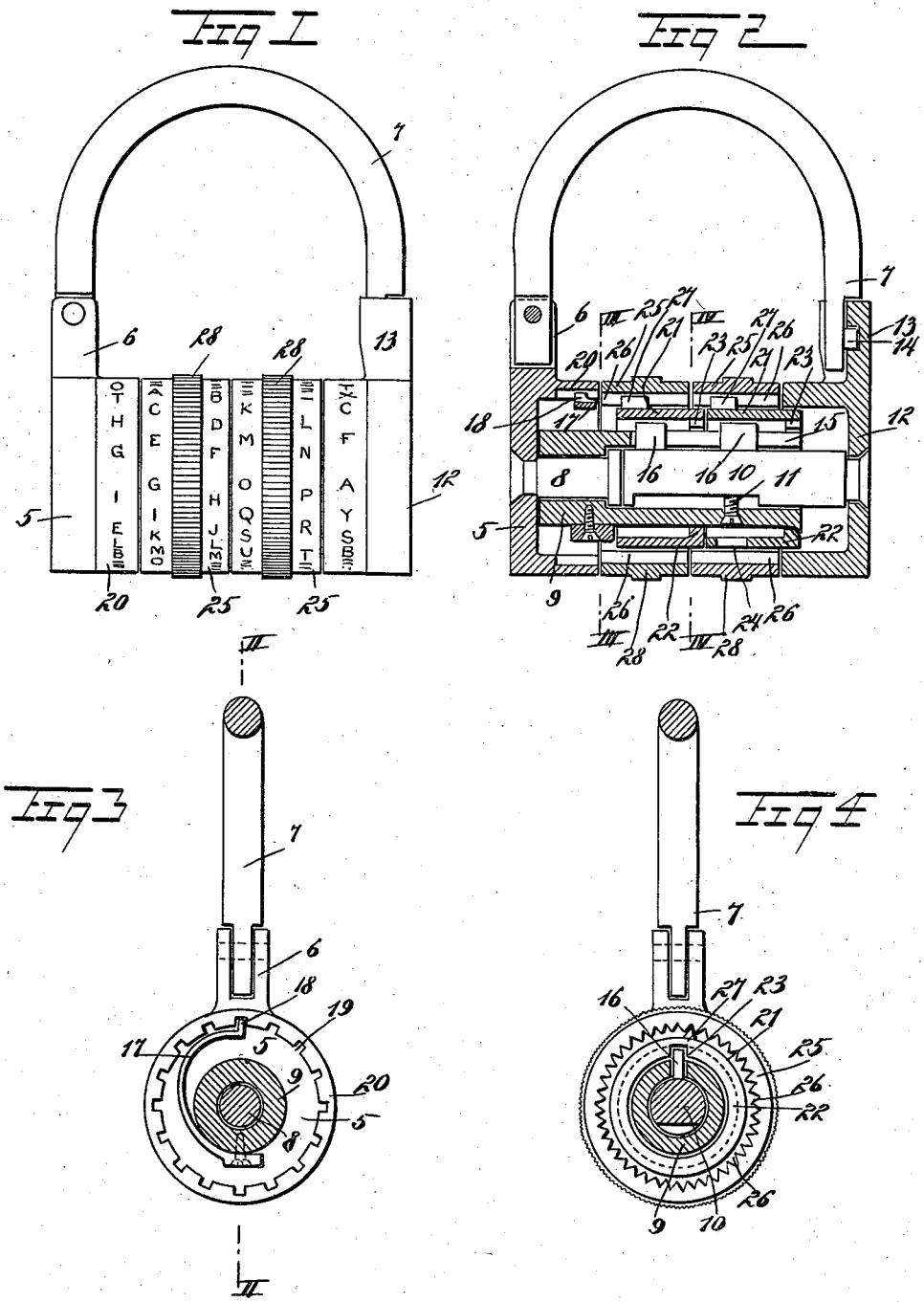

RICHARD B. H. LEIGHTON, OF PHILADELPHIA, PENNSYLVANIA.

PERMUTATION-LOCK.

SPECIFICATION forming part of Letters Patent No. 601,519, dated March 29, 1898.

Application filed December 8, 1897. Serial No. 661,182. (No model.)

*To all whom it may concern:*

Be it known that I, RICHARD B. H. LEIGHTON, of Philadelphia, in the county of Philadelphia and State of Pennsylvania, have invented a new and Improved Permutation-Lock, of which the following is a full, clear, and exact description.

The invention consists in certain novel features of construction and combinations of parts, which will be fully described hereinafter and defined in the claims.

Reference is to be had to the accompanying drawings, forming a part of this specification, in which similar characters of reference indicate corresponding parts in all the views.

Figure 1 is a side elevation of the invention. Fig. 2 is a sectional view on the line II II of Fig. 3. Fig. 3 is a sectional view on the line III III of Fig. 2, and Fig. 4 is a sectional view on the line IV IV of Fig. 2.

The lock has a circular head 5, provided with lugs 6, to which the bow 7 of the lock is hinged. The head 5 has rigidly secured thereto a pin 8, which projects inward centrally and carries loosely a sleeve 9. The sleeve 9 projects beyond the pin 8 and carries the bolt 10, which has slidable movement in the sleeve 9, said movement being limited by a set-screw 11, removably seated in the sleeve 9. The outer end of the bolt 10 is loosely connected with the locking-head 12. The head 12 has a recessed lug 13, with which a projection 14 on the bow 7 engages to hold the bow in locked position.

The sleeve 9 has a longitudinally-extending slot 15 formed therein. This slot 15 receives the two wards 16 of the bolt.

The sleeve 9 is held adjustably on the pin 8 by means of a spring 17, fast at one end to the sleeve 9, and which has its free end provided with a spur 18, adapted to enter any one of the several notches 19, formed in the inner face of the inwardly-overhanging flange 20 of the rigid head 5.

The sleeve 9 carries two rings 21, the leftward ring bearing against the spring 17 and the rightward ring being held on the sleeve 9 by upsetting the end of said sleeve. The rings 21 are respectively arranged to embrace the wards 16 and to be freely revoluble. Each ring 21 has a flange 22, each of which is provided with a recess 23, through which the wards 16 may pass in the acts of locking and unlocking the lock. When the wards 16 are in alinement with the recesses 23, the bolt 10 may be moved in either direction; but when the said notches are out of alinement with the wards the bolt cannot be moved. The rightward ring 21 is provided with a recess 24, capable of registering with the screw 11, so that said screw may be reached by a screwdriver and placed or displaced, as desired.

The rings 21 are encircled by exterior rings 25, each of which is provided in its inner surface with a series of closely-adjacent grooves 26. These grooves 26 are adapted to receive feathers 27, arranged one on each ring 21. By these means the rings 25 may be respectively adjusted on the rings 21 so that the members of each pair of rings may occupy any desired position relative to each other. Each groove 26 is represented by a certain letter on the corresponding ring 25. The rings 21 are turned to the position for moving the bolt 10 by means of the rings 25, for which purpose the latter rings are provided with milled belts 28.

The combination of the lock is changed by means of the adjustment of the sleeve 9 and by means of the adjustment of the feathers 27 in the grooves 26. Assuming that the parts are in the position shown in Fig. 2, the lock is opened by moving the two rings 25 to the predetermined combination of letters, which letters are produced on the heads 5 and 12 and on the rings 25. This moves the rings 21 so as to place the notches 23 in registry with the wards 16. When this is done, the bolt 10 may be drawn out and the ear 13 will be disengaged from the bow 7. To lock the parts, the rings 25 are turned to the combination which will place the notches 23 in alinement with the slot 15 of the sleeve 9, whereupon the bolt 10 may be pushed inward and the ear 13 engaged with the stud 14 of the bow. The rings 25 are then given a slight turn, so as to throw the notches 23 out of alinement with the wards 16.

The advantage of this lock is that the sleeve 9 may be adjusted to any position on the pin 8, and each adjustment of the sleeve 9 changes the combination, so that with this change, as well as the change which is possible by means of the feathers 27 and grooves 26, the combinations of the lock may be multiplied indefinitely. The combination may be changed at each time the lock is set. It is preferred to mark the heads and rings with letters; but other marks may be employed, if desired. If desired, any number of rings 25 and corresponding parts may be used.

Having thus described my invention, I claim as new and desire to secure by Letters Patent—

1. The combination of a head, a pin attached thereto, a sleeve turning on the pin, a second head, a bolt in connection with the second head, a connection between the sleeve and the first-named head, by which the sleeve is held adjustably in rigid connection with the head, a ring turning on the sleeve and having a notched flange, a ward attached to the bolt and capable of engaging said flange, and an exterior ring encircling the first-named ring and having adjustable connection therewith.

2. The combination of a head, a pin fixed centrally to the head, a sleeve revoluble on the pin, a spring attached to the sleeve and capable of having adjustable connection with the head, a bolt reciprocal in the sleeve, a ward attached to the bolt and movable through a slot in the sleeve, a ring encircling the sleeve and having a notched flange coacting with the ward, and an exterior ring encircling the first-named ring and having adjustable connection therewith.

3. The combination of two heads, a pin connected to one head, a bolt connected to the other head, a sleeve revoluble on the pin and having the bolt slidable therein, a spring connected with the sleeve and capable of engaging the head to hold the sleeve rigid, a ward on the bolt and movable longitudinally through a slot in the sleeve, a ring encircling the sleeve and having a notched flange coacting with the ward of the bolt, an exterior ring encircling the first-named ring and having adjustable connection therewith, and a bow pivoted to one of the heads and capable of being engaged and held by the other head.

4. The combination of a head, a pin carried thereby, a sleeve capable of revolving on the pin, adjustable means for holding the sleeve rigid with the head, a bolt slidable in the sleeve and having a ward extending through the sleeve, a ring encircling the sleeve and having a notched flange coacting with the ward, a head attached to the bolt, and a bow pivoted to one head and capable of being engaged and held by the other head.

5. A permutation-lock having a head, a sleeve mounted to turn thereon, adjustable means for holding the sleeve stationary with the head, a bolt slidable in the sleeve and having a ward projecting through a slot in the sleeve, and a ring turning on the sleeve and provided with a notched flange.

6. The combination of a head, a sleeve supported on the head, means for adjustably holding the sleeve stationary with the head, a bolt slidable in the sleeve and having a ward projecting through a slot in the sleeve, a ring encircling the sleeve and having a notched flange coacting with the ward, a head attached to the bolt, and a bow held by and between the two heads.

7. The combination of a head having an inwardly-overhanging flange with notches in its inner face, a sleeve capable of turning on the head, a spring attached to the sleeve and capable of engaging the notches of the flange, a bolt slidable in the sleeve, a ward attached to the bolt and projected through a slot in the sleeve, and a ring encircling the sleeve and provided with a notched flange coacting with the ward of the bolt.

8. In a permutation-lock, the combination of a head, a sleeve mounted to turn thereon, means for holding the sleeve in various adjustments with reference to the head, a bolt having sliding connection with the sleeve, and means for removably holding the bolt in the sleeve.

9. A permutation-lock, having a head, a tube mounted to turn thereon, means for adjustably holding the tube in any one of a plurality of positions with reference to the head, a bolt sliding in the tube, and a ring encircling the tube and coacting with the bolt to hold the same.

10. A permutation-lock having a head, a tube turning thereon, and means for adjustably holding the tube in any one of a plurality of positions with reference to the head, the head having characters marked thereon, such characters respectively representing the positions in which the said tube may be held.

RICHARD B. H. LEIGHTON.

Witnesses:
 ALBERT E. LEIGHTON,
 JOHN H. FUNK.